United States Patent
Lee et al.

(10) Patent No.: US 10,161,536 B2
(45) Date of Patent: Dec. 25, 2018

(54) COOLANT CONTROL VALVE UNIT

(71) Applicant: Hyundai Motor Company, Seoul (KR)

(72) Inventors: Yonggyu Lee, Suwon-si (KR); Jung Nam Lee, Seoul (KR)

(73) Assignee: Hyundai Motor Company, Seoul (KR)

(*) Notice: Subject to any disclaimer, the term of this patent is extended or adjusted under 35 U.S.C. 154(b) by 40 days.

(21) Appl. No.: 15/374,683

(22) Filed: Dec. 9, 2016

(65) Prior Publication Data

US 2018/0112782 A1    Apr. 26, 2018

(30) Foreign Application Priority Data

Oct. 21, 2016  (KR) .................. 10-2016-0137783

(51) Int. Cl.
| | | |
|---|---|---|
| *F16K 11/044* | (2006.01) | |
| *F16K 11/078* | (2006.01) | |
| *F01P 7/14* | (2006.01) | |
| *F01P 11/08* | (2006.01) | |
| *F16K 11/065* | (2006.01) | |

(52) U.S. Cl.
CPC .............. *F16K 11/078* (2013.01); *F01P 7/14* (2013.01); *F01P 11/08* (2013.01); *F16K 11/044* (2013.01); *F16K 11/065* (2013.01); *F01P 2007/146* (2013.01); *Y10T 137/86509* (2015.04)

(58) Field of Classification Search
CPC ....... F01P 2007/146; F01P 7/14; F16K 11/02; F16K 11/04; F16K 11/044; F16K 11/0833; F16K 11/0836

USPC .............. 137/625.5, 625.48, 625.12, 625.13, 137/625.17, 625.18, 625.19
See application file for complete search history.

(56) References Cited

U.S. PATENT DOCUMENTS

| | | | | |
|---|---|---|---|---|
| 4,327,864 A | * | 5/1982 | Gupta ................. | G05D 23/185 137/625.12 |
| 2012/0279462 A1 | * | 11/2012 | Warnery et al. ........ | F01P 7/167 123/41.08 |

FOREIGN PATENT DOCUMENTS

| | | |
|---|---|---|
| JP | 2009-515106 A | 4/2009 |
| JP | 2010-139073 A | 6/2010 |
| JP | 2013-517416 A | 5/2013 |
| JP | 2016-089931 A | 5/2016 |
| KR | 10-1283086 B1 | 7/2013 |
| KR | 10-1577213 B1 | 12/2015 |
| KR | 10-2016-0034451 A | 3/2016 |
| WO | WO 2007/051825 A1 | 5/2007 |
| WO | WO 2009/141945 A1 | 11/2009 |

* cited by examiner

*Primary Examiner* — Kevin Lee
(74) *Attorney, Agent, or Firm* — Morgan, Lewis & Bockius LLP (57) ABSTRACT

A coolant control valve device may include a plurality of coolant passages through which a coolant passes; a valve including a plurality of valve wings, wherein each of the valve wings is disposed at an inlet of each of the coolant passages, respectively and has different heights from each other; and a driver moving the valve in a vertical direction thereof, wherein the valve opens and closes some or all of a plurality of inlets with a difference in time, depending on a movement range of the valve.

20 Claims, 11 Drawing Sheets

COOLANT CONTROL VALVE UNIT

CROSS-REFERENCE TO RELATED APPLICATION

The present application claims priority to Korean Patent Application No. 10-2016-0137783 filed on Oct. 21, 2016, the entire contents of which is incorporated herein for all purposes by this reference.

BACKGROUND OF THE INVENTION

Field of the Invention

The present invention relates to a coolant control valve device controlling coolant supplied to at least two or more coolant requiring parts, respectively, using a valve structure having an asymmetric type simple structure.

Description of Related Art

An engine generates rotation force from combustion of fuel, and the remaining energy from the combustion of the fuel is exhausted as heat energy. In particular, a coolant absorbs heat energy while circulating through the engine, a heater, and a radiator, and discharges the absorbed heat energy to the outside.

When a temperature of the coolant of the engine is low, viscosity of oil is increased, such that frictional force is increased, fuel consumption tends to be increased. In addition, a temperature of an exhaust gas is slowly increased, such that time for activation of a catalyst is extended, and accordingly, quality of the exhaust gas may be deteriorated. Furthermore, time for normalization of functions of the heater may be extended.

When the temperature of the coolant of the engine is excessively high, knocking occurs, and ignition timing needs to be adjusted for suppression of the occurrence of knocking, thereby causing performance deterioration. In addition, when a temperature of a lubricant is excessively high, lubrication performance may be deteriorated.

Therefore, a single coolant control valve unit controlling several cooling elements is applied to maintain a temperature of the coolant at a specific portion of the engine to be high and a temperature of the coolant at other portions to be low.

Meanwhile, in order to control the coolant distributed to the radiator, the heater, an oil cooler, and the like, using the single coolant control valve unit, the coolant control valve unit has a structure in which a plurality of valve members are arranged on a plane in a single valve housing. Therefore, an overall size of the coolant control valve unit is increased, such that a weight thereof is increased, and degrees of freedom in design and arrangement may be limited.

Figure 1:
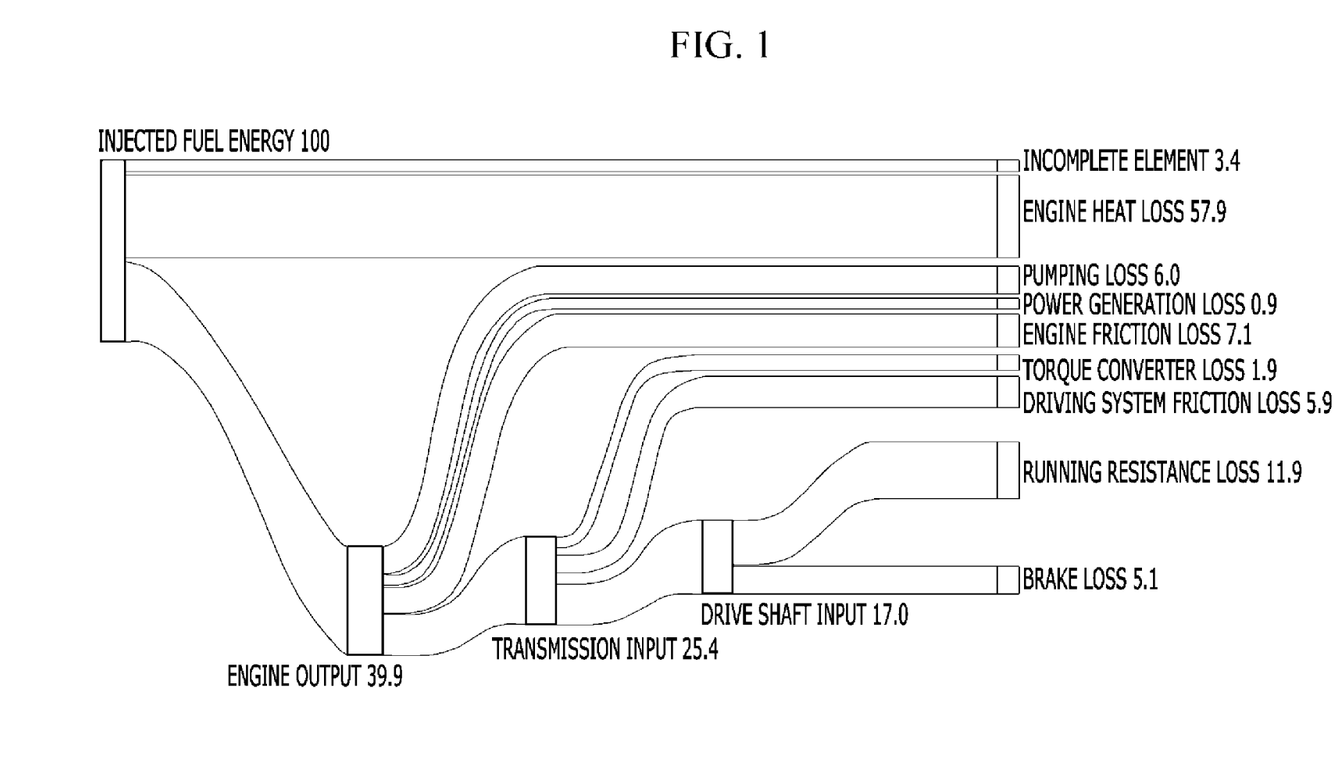
FIG. 1 is a graph illustrating fuel efficiency of a vehicle.
Figure 2:
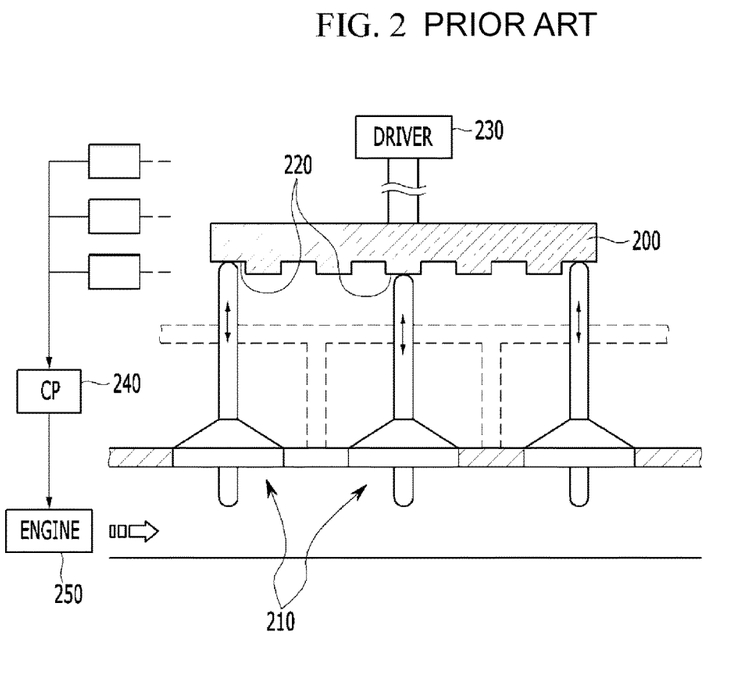
FIG. 2 is a schematic configuration view of a coolant control valve device according to the related art.

FIG. 1 is a graph illustrating fuel efficiency of a vehicle, and FIG. 2 is a schematic configuration view of a coolant control valve unit according to the related art.

Referring to FIG. 1, if an amount of injected fuel energy is 100, an amount of energy lost by an engine heat loss is 57.9, and an amount of energy consumed by running resistance is only 11.9. Therefore, a coolant control valve unit for decreasing the engine heat loss is important.

Referring to FIG. 2, the coolant control valve unit includes a driver 230, a cam 200, and valves 210, and the driver 230 rotates the cam 200.

In addition, as each of the valves 210 is lifted depending on a profile of a track 220 formed on one surface of the cam 200, a coolant passage is opened and closed.

Therefore, the coolant control valve unit distributes a coolant pumped by a coolant pump 240 and supplied through an engine 250 to each coolant requiring part. However, since coolant passages are opened and closed by various valves 210, a structure of the coolant control valve unit is complicated, and a volume occupied by the coolant control valve unit is large.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a coolant control valve device having a new structure having advantages of simplifying an entire structure of the valve device and decreasing a volume occupied by the valve device by each independently opening or closing at least two coolant passages with a difference in time through a single valve.

Various aspects of the present invention are directed to providing a coolant control valve device including; a plurality of a plurality of coolant passages through which a coolant passes; a valve including a plurality of valve wings, wherein each of the valve wings is disposed at an inlet of each of the plurality of coolant passages, respectively and has different heights from each other; and a driver moving the valve in a vertical direction thereof, wherein the valve opens and closes some or all of the plurality of inlets with a difference in time, depending on a movement range of the valve.

The plurality of inlets may include at least two inlets, first and second inlets, and the valve may include first and second valve wings corresponding to the first and second inlets, respectively.

The coolant passage may include first and second coolant passages communicating with the first and second inlets, respectively, and the coolant control valve device may further include a passage separation partition separating the first and second coolant passages from each other.

The first and second valve wings of the valve may have outer peripheral surfaces slid along inside peripheral surfaces of the first and second inlets, respectively, the outer peripheral surfaces of the first and second valve wings may have first and second heights, respectively, in a movement direction of the valve, and the second height may be higher than the first height.

The coolant control valve device may further include a rod connecting the driver and the valve to each other, wherein the rod is disposed to penetrate through the passage separation partition.

The rod may be disposed along a slot formed in a side surface of the passage separation partition.

A partition groove into which an end portion of the passage separation partition is inserted may be formed in the valve.

The passage separation partitions may be disposed to have a predetermined rotation interval therebetween based on a central axis of the rod, to correspond to the first and second inlets.

The outer peripheral surface of the valve may be formed along a circle based on the rod.

The plurality of inlets may further include a third inlet, and the valve may include a third valve wing corresponding to the third inlet.

The first to third valve wings of the valve may have outer peripheral surfaces slid along inside peripheral surfaces of the first to third inlets, respectively, the outer peripheral surfaces of the first to third valve wings may have first to third heights, respectively, in a movement direction of the valve, and the third height may be higher than the second height, and the second height may be higher than the first height.

The coolant passage includes first to third coolant passages communicating with the first to third inlets, respectively, and the coolant control valve device may further include a passage separation partition separating the first to third coolant passages from each other.

The coolant control valve device may further include a rotation part rotating the valve so that the first inlet corresponds to the second valve wing and the second inlet corresponds to the first valve wing in a state in which the first inlet corresponds to the first valve wing and the second inlet corresponds to the second valve wing.

Starting positions of the first and second valve wings may be different from each other in a movement direction of the valve.

While the driver pushes the valve, the first valve wing may open the first inlet first, and then the second valve wing may open the second inlet.

While the driver pulls the valve, the second valve wing may open the second inlet first, and then the first valve wing may open the first inlet.

When the valve is pulled or pushed by the driver, the partition groove formed in the valve may provide a depth to insert the end portion of the passage separation partition.

Various aspects of the present invention are directed to providing a coolant control valve device including; a single rod; a single valve formed at one side of the rod to open and close at least first and second inlets; a passage separation partition separating first and second coolant passages communicating with the first and second inlets, respectively, from each other and penetrated by the rod in a longitudinal direction of the rod; and a driver pulling or pushing the rod to open and close at least two inlets, respectively, wherein the valve includes first and second valve wings corresponding to the first and second inlets, the first and second valve wings have outer peripheral surfaces slid along inside peripheral surfaces of the first and second inlets, respectively, the outer peripheral surfaces of the first and second valve wings have first and second heights in a longitudinal direction of the rod, and the second height is higher than the first height.

The passage separation partitions may be disposed to have a predetermined rotation interval therebetween based on a central axis of the rod, to correspond to the first and second inlets.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the certain principles of the invention. The specific design features of the present invention as included herein, including, for example, specific dimensions, orientations, locations, and shapes will be determined in part by the intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Figure 3:
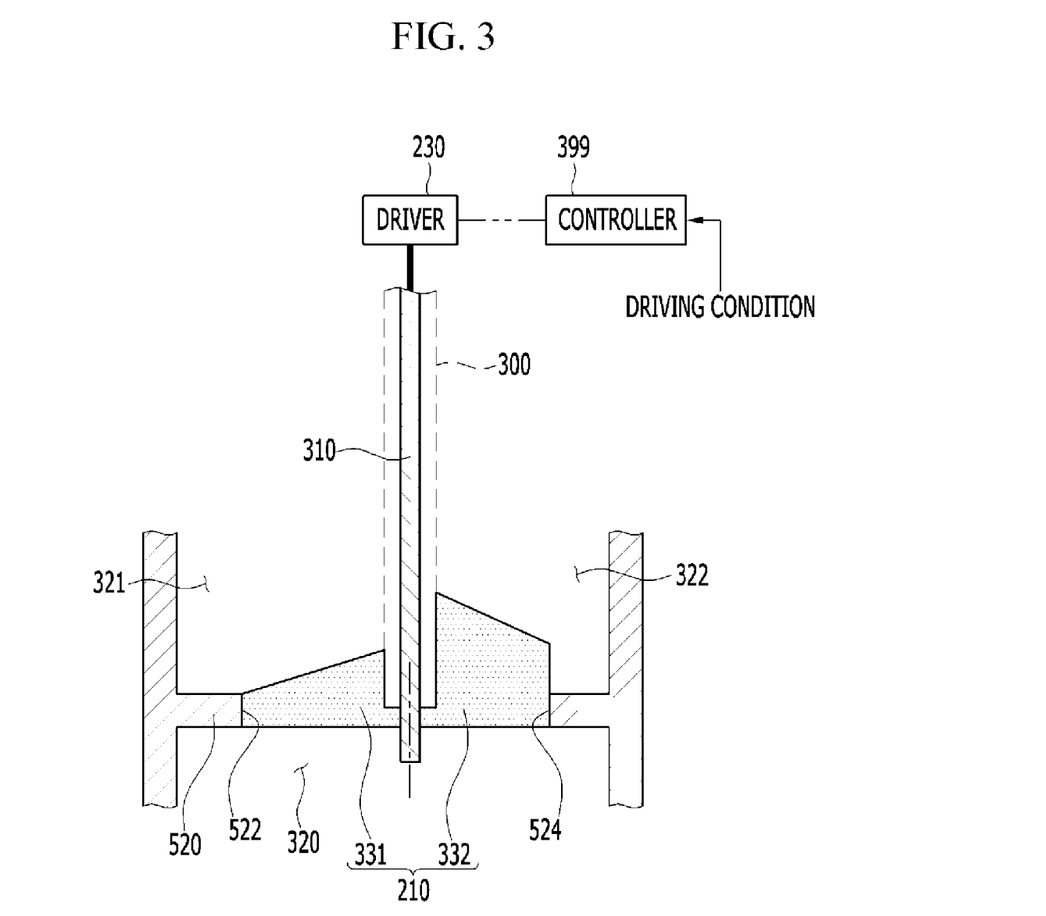
FIG. 3 is a partial cross-sectional view of a coolant control valve device according to an exemplary embodiment of the present invention in a longitudinal direction.

FIG. 3 is a partial cross-sectional view of a coolant control valve device according to an exemplary embodiment of the present invention in a longitudinal direction.

Referring to FIG. 3, a coolant control valve device includes a controller 399, a driver 230, a rod 310, a passage separation partition 300, a first coolant passage 321, a second coolant passage 322, an inlet partition 520, a first inlet 522, a main coolant passage 320, a valve 210 including first and second valve wings 331 and 332, and a second inlet 524.

A coolant supplied to the main coolant passage 320 is supplied to the first coolant passage 321 through the first inlet 522 and supplied to the second coolant passage 322 through the second inlet 524.

The passage separation partition 300 is disposed between the first and second coolant passages 321 and 322. Here, the rod 310 is disposed to penetrate through the passage separation partition 300, and the first valve wing 331 opening or closing the first inlet 522 and the second valve wing 332 opening or closing the second inlet 524 are formed at an end portion of the rod 310.

According to the exemplary embodiment of the present invention, the controller 399 may control the driver 230 depending on a driving condition including a temperature of the coolant, and the driver 230 may pull the rod 310 upwardly or push the rod 310 downwardly to open and close the first and second inlets 522 and 524.

Figure 5:
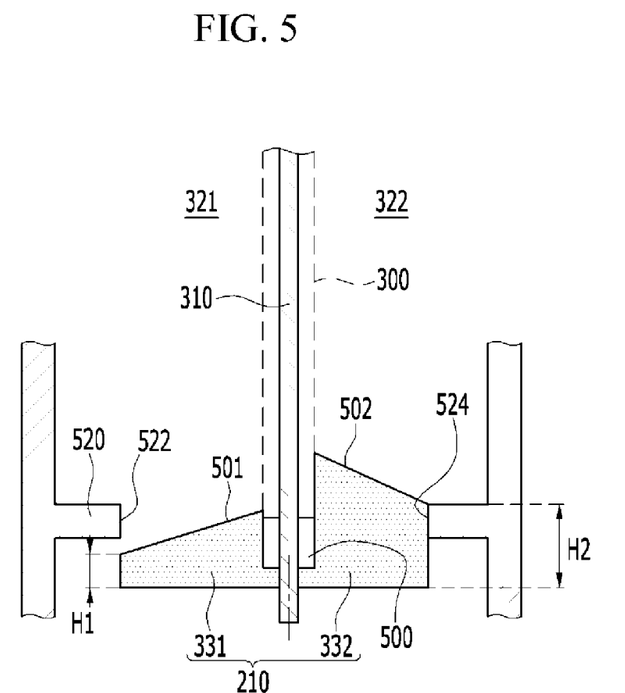
FIG. 5 is a partial cross-sectional view of the coolant control valve device according to the exemplary embodiment of the present invention in a longitudinal direction.

FIG. 5 is a partial cross-sectional view of the coolant control valve device according to the exemplary embodiment of the present invention in a longitudinal direction.

Referring to FIG. 5, an outer peripheral surface of the first valve wing 331 corresponding to an inside peripheral surface of the first inlet 522 has a first height H1, and an outer peripheral surface of the second valve wing 332 wing corresponding to an inside peripheral surface of the second inlet 524 has a second height H2. Here, the second height H2 may be higher than the first height H1.

Therefore, the first and second valve wings 331 and 332 may simultaneously close the first and second inlets 522 and 524, the first valve wing 331 may open the first inlet 522 and at the same time, the second valve wing 332 may open the second inlet 524, or the first and second valve wings 331 and 332 may simultaneously open the first and second inlets 522 and 524, depending on upper and lower positions of the rod 310.

That is, at least two inlets may be controlled by controlling the upper and lower positions of a single rod 310.

Figure 4:
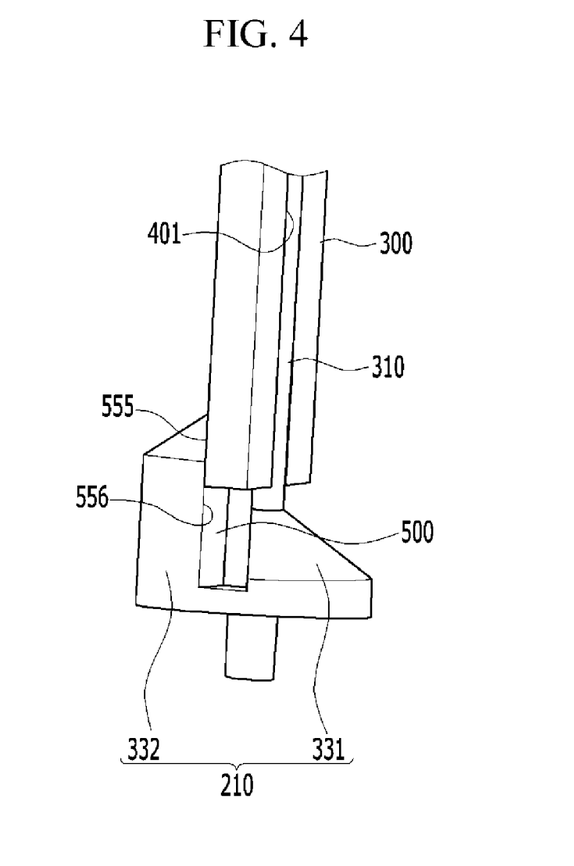
FIG. 4 is a partial perspective view of the coolant control valve device according to the exemplary embodiment of the present invention.

FIG. 4 is a partial perspective view of the coolant control valve device according to the exemplary embodiment of the present invention.

Referring to FIG. 4, a partition groove 500 into which a lower end portion of the passage separation partition 300 is inserted is formed in the valve 210, an outside surface 555 of the passage separation partition 300 contacts an inside surface 556 of the partition groove 500 to be slid along the inside surface 556, forming a sealing structure between the first and second coolant passages 321 and 322.

In addition, as illustrated in FIG. 3, the rod 310 may have a structure in which the rod 310 penetrates through a central portion of the passage separation partition 300, and as illustrated in FIG. 4, the rod 310 may be disposed along a slot 401 formed in a side surface of the passage separation partition 300.

Figure 6A:
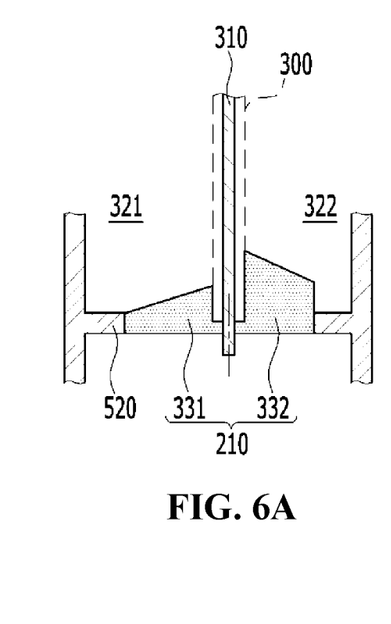
FIG. 6A, FIG. 6B, and FIG. 6C are cross-sectional views illustrating an operation method of the coolant control valve device according to the exemplary embodiment of the present invention.
Figure 6B:
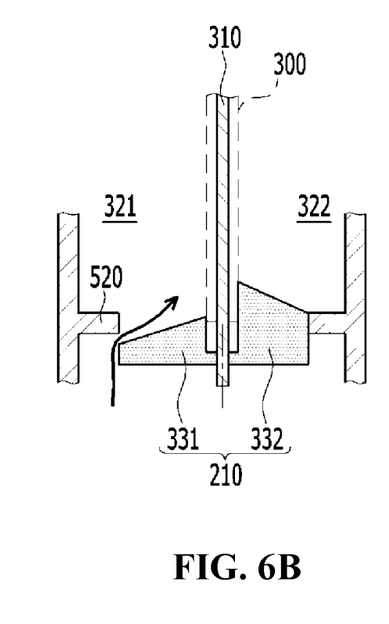
Figure 6C:
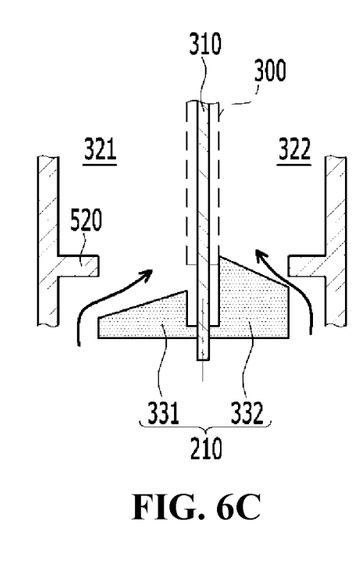

FIGS. 6A to 6C are cross-sectional views illustrating an operation method of the coolant control valve device according to the exemplary embodiment of the present invention.

Referring to FIG. 6A, a position of the rod 310 lifted by the driver 230 is maintained, and the first and second valve wings 331 and 332 simultaneously close the first and second outlets 522 and 524.

Referring to FIG. 6B, the rod 310 is primarily lowered by the driver 230, the first valve wing 331 opens the first inlet 522, and at the same time, the second valve wing 332 closes the second inlet 524.

Referring to FIG. 6C, the rod 310 is secondarily lowered by the driver 230, and the first and second valve wings 331 and 332 simultaneously open the first and second outlets 522 and 524.

Figure 7:
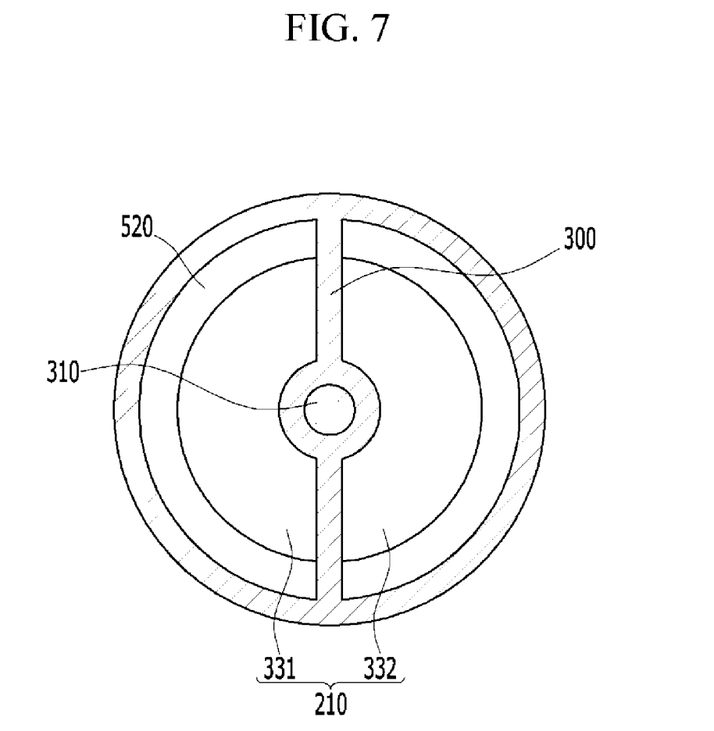
FIG. 7 is a partial cross-sectional view of a coolant control valve device according to an exemplary embodiment of the present invention in a width direction.

FIG. 7 is a partial cross-sectional view of a coolant control valve device according to an exemplary embodiment of the present invention in a width direction.

Referring to FIG. 7, in the valve 210 disposed at the lower end portion of the rod 310, the first and second valve wings 331 and 332 are formed along a circle based on a central axis of the rod 310. That is, an outer peripheral surface of the valve 210 has a trajectory along the circle based on the central axis of the rod 310.

Further, the passage separation partition 300 has a linear structure along a diameter passing through the central portion of the rod 310, and the first and second valve wings 331 and 332 have a semi-circular structure. That is, the first and second valve wings 331 and 332 having the semi-circular structure are combined with each other, forming a single circular valve 210.

Figure 8:
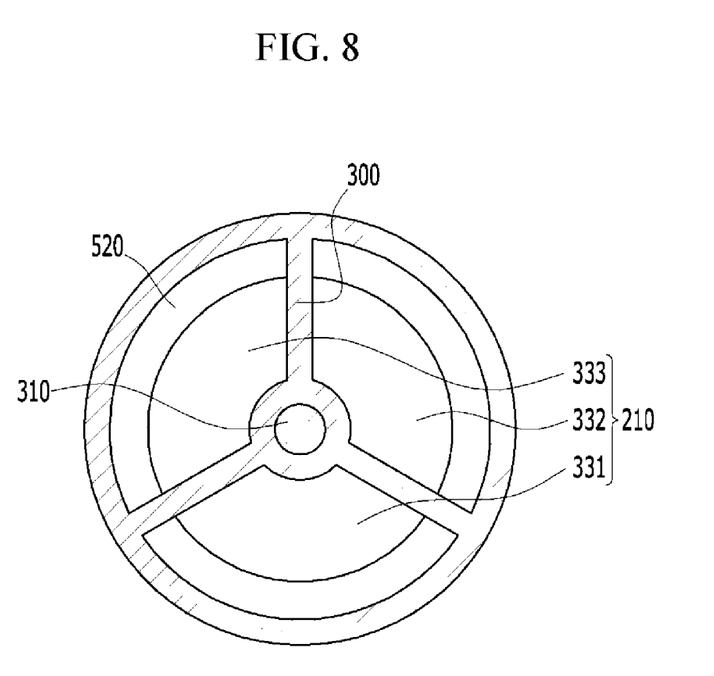
FIG. 8 and FIG. 9 are partial cross-sectional views of coolant control valve units according to other exemplary embodiments of the present invention in a width direction.
Figure 9:
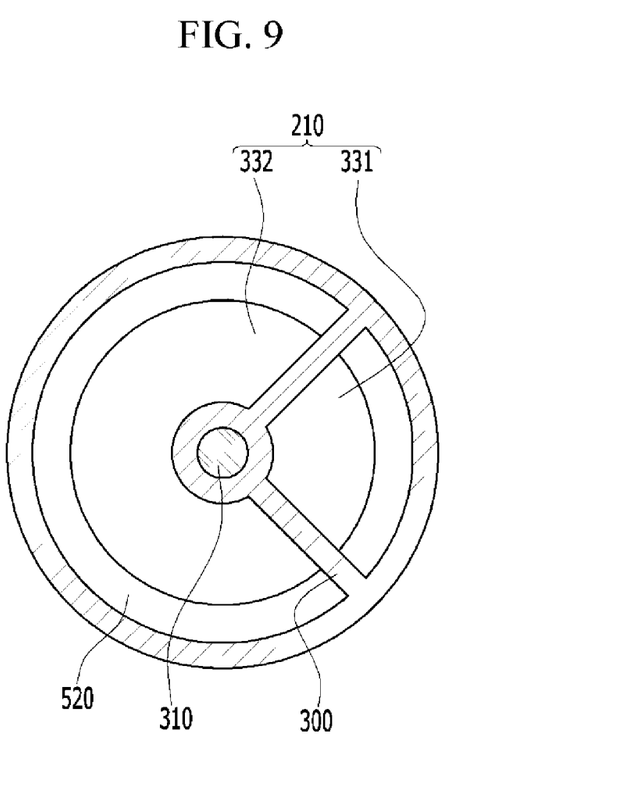

FIGS. 8 and 9 are partial cross-sectional views of coolant control valve units according to other exemplary embodiments of the present invention in a width direction.

Referring to FIG. 8, a valve 210 disposed at a lower end portion of a rod 310 includes a first valve wing 331, a second valve wing 332, and a third valve wing 333, and the first to third valve wings 331 to 333 are formed along a circle based on a central axis of the rod 310.

That is, an outer peripheral surface of the valve 210 has a trajectory along the circle based on the central axis of the rod 310.

Further, passage separation partitions 300 are each formed along a radius passing through a central portion of the rod 310, and the passage separation partitions 300 are formed to have an interval of approximately 120 degrees therebetween based on the central axis of the rod 310.

Here, the first valve wing 331, the second valve wing 332, or the third valve wing 333 has a sector shape. That is, the first to third valve wings 331 to 333 having the sector shape are combined with each other, forming a single circular valve 210.

Referring to FIG. 8, an outer peripheral surface of the first valve wing 331 corresponding to an inside peripheral surface of a first inlet 522 has a first height H1, an outer peripheral surface of the second valve wing 332 corresponding to an inside peripheral surface of a second inlet 524 has a second height H2, and an outer peripheral surface of the third valve wing 333 corresponding to an inside peripheral surface of a third inlet has a third height.

Here, the third height may be higher than the second height H2; and the second height H2 may be higher than the first height H1.

Referring to FIG. 9, a valve 210 disposed at a lower end portion of a rod 310 includes first and second valve wings 331 and 332, and the first and second valve wings 331 and 332 are formed along a circle based on a central axis of the rod 310.

That is, an outer peripheral surface of the valve 210 has a trajectory along the circle based on the central axis of the rod 310. Further, passage separation partitions 300 are each formed along a radius passing through a central portion of the rod 310, and only two passage separation partitions 300 are formed to have an interval of approximately 90 degrees therebetween based on the central axis of the rod 310.

Here, a shape of the first valve wing 331 is a sector of which an angle is less than 180 degrees, and a shape of the second valve wing 332 is a sector of which an angle is greater than 180 degrees. That is, the first and second valve wings 331 and 332 having the sector shapes are combined with each other, forming a single circular valve 210.

Figure 10A:
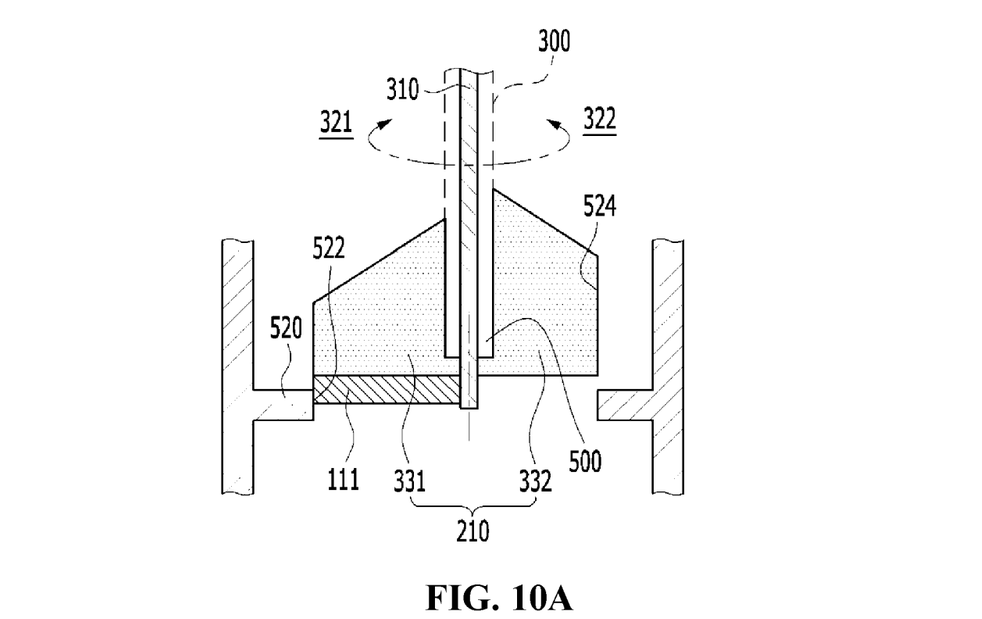
FIG. 10A and FIG. 10B are partial cross-sectional views of a coolant control valve device according to still another exemplary embodiment of the present invention.
Figure 10B:
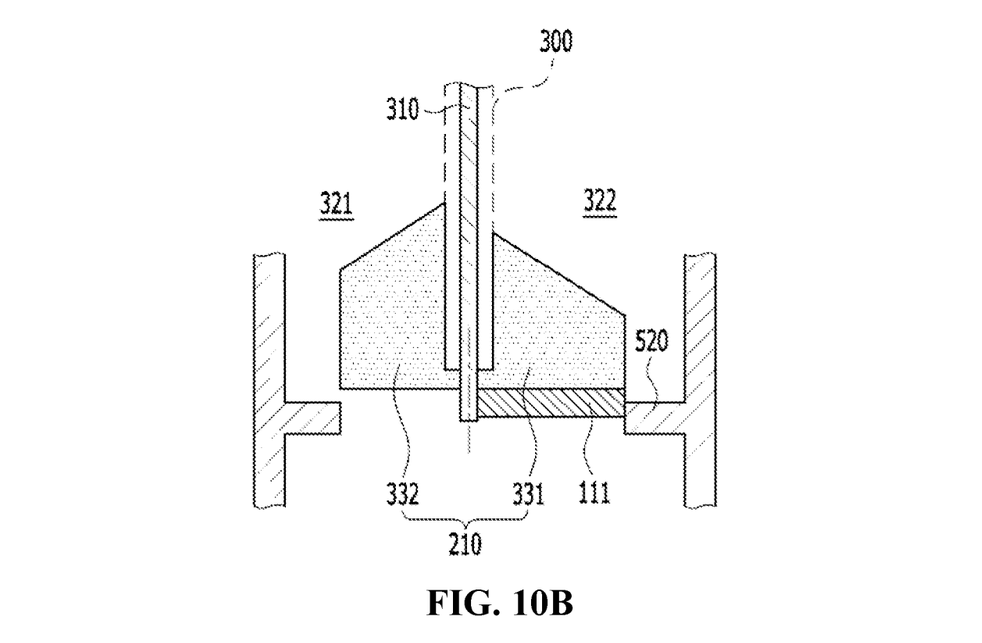

FIGS. 10A and 10B are partial cross-sectional views of a coolant control valve device according to still another exemplary embodiment of the present invention.

Referring to FIGS. 10A and 10B, the coolant control valve device includes a rod 310, a separation partition 300, a valve 210 including first and second valve wings 331 and 332, an inlet partition 520, a first coolant passage 321, a second coolant passage 322, and a valve extension part 111 as components.

According to the exemplary embodiment of the present invention, the rod 310 and the valve 210 are disposed to be rotatable at a predetermined angle based on a central axis through which the rod 310 passes. That is, in FIG. 3, the driver 230 may perform a first function of pushing the rod 310 downwardly or pulling the rod 310 upwardly and a function of a rotation part of rotating the rod 310.

Referring to FIGS. 10A and 10B and FIG. 4, since the valve 210 may not rotate in a state in which the separation partition 300 is inserted into a partition groove, the driver 230 may lower the rod 310 downwardly as low as possible and rotate the rod 310 and the valve 210 in a state in which a lower end portion of the separation partition 300 is separated from the partition groove of the valve 210.

Therefore, FIG. 10A illustrates a first state in which a first inlet of the first coolant passage 321 corresponds to the first valve wing 331, and a second inlet of the second coolant passage 322 corresponds to the second valve wing 332.

FIG. 10B illustrates a second state in which the first inlet corresponds to the second valve wing 332, and the second inlet corresponds to the first valve wing 331 (see FIG. 10B).

Further, in FIGS. 10A and 10B, the extension part 111 extended downwardly is formed at a lower end surface of the first valve wing 331, and an outer peripheral surface of the extension part 111 is formed to be slid along an inside peripheral surface of the inlet of the second coolant passage 322.

FIG. 11A, FIG. 11B, FIG. 11C, and FIG. 11D are cross-sectional views illustrating an operation sequence of the coolant control valve device according to still another exemplary embodiment of the present invention.

Figure 11A:
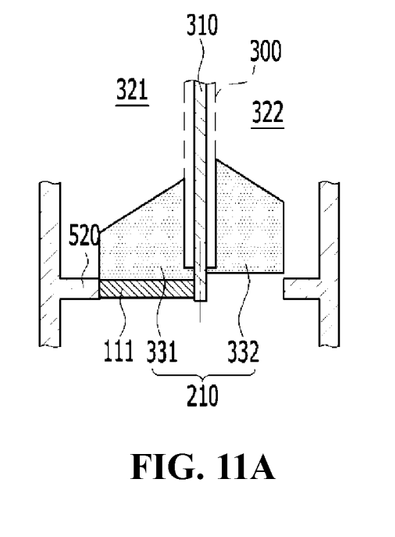
FIG. 11A, FIG. 11B, FIG. 11C, and FIG. 11D are cross-sectional views illustrating an operation sequence of the coolant control valve device according to still another exemplary embodiment of the present invention.

Referring to FIG. 11A, a driver 230 may lift a valve 210 upwardly through a rod 310, and a second valve wing 332 may open an inlet of a second coolant passage 322.

Figure 11B:
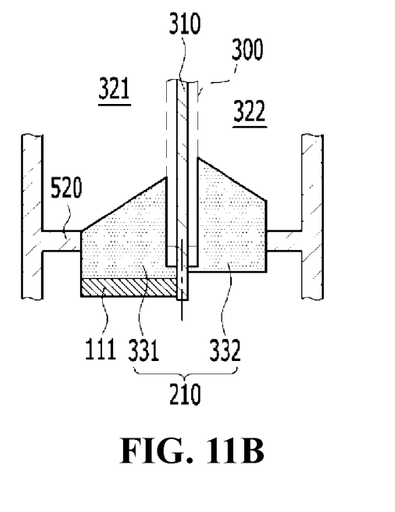

Referring to FIG. 11B, the driver 230 may primarily lower the valve 210 through the rod 310, and first and second valve wings 331 and 332 may close both inlets of the first and second coolant passages 321 and 322.

Figure 11C:
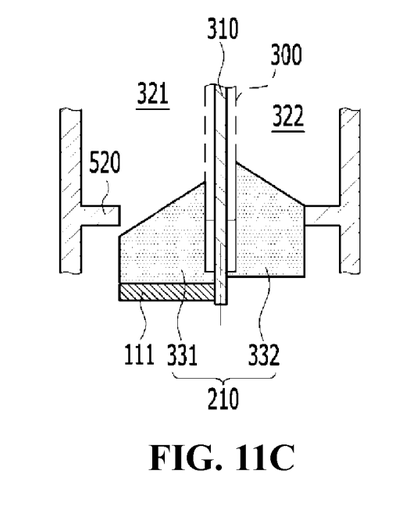

Referring to FIG. 11C, the driver 230 may secondarily lower the valve 210 through the rod 310, the first valve wing 331 may open the inlet of the first coolant passage 321, and the second valve wing 332 may close the inlet of the second coolant passage 322.

Figure 11D:
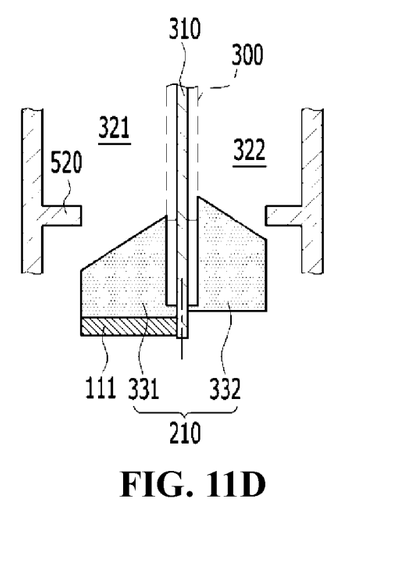

Referring to FIG. 11D, the driver 230 may tertiarily lower the valve 210 through the rod 310, and the first and second valve wings 331 and 332 may open both the inlets of the first and second coolant passages 321 and 322.

While this invention has been described in connection with what is presently considered to be practical exemplary embodiments, it is to be understood that the invention is not limited to the disclosed exemplary embodiments. On the contrary, it is intended to cover various modifications and equivalent claims as well as various alternatives and modifications thereof. It is intended that the scope of the invention be defined by the Claims appended hereto and their equivalents."

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A coolant control valve device comprising:
   a plurality of coolant passages through which a coolant passes;
   a valve including a plurality of valve wings, wherein each of the valve wings is disposed at an inlet of each of the coolant passages, respectively and has different heights from each other; and
   a driver moving the valve in a vertical direction thereof, wherein the valve opens and closes at least one of a plurality of inlets depending on a movement range of the valve.

2. The coolant control valve device of claim 1, wherein the plurality of inlets includes first and second inlets, and the valve wings include first and second valve wings corresponding to the first and second inlets of the plurality of inlets, respectively.

3. The coolant control valve device of claim 2, wherein the coolant passages include first and second coolant passages communicating with the first and second inlets, respectively, and
   the coolant control valve device further includes a passage separation partition separating the first and second coolant passages from each other.

4. The coolant control valve device of claim 2, wherein the first and second valve wings have outer peripheral surfaces slid along inside peripheral surfaces of the first and second inlets, respectively,
   the outer peripheral surfaces of the first and second valve wings have first and second heights, respectively, in a movement direction of the valve, and
   the second height is higher than the first height.

5. The coolant control valve device of claim 3, further including:
   a rod connecting the driver and the valve to each other, wherein the rod is disposed to penetrate through the passage separation partition.

6. The coolant control valve device of claim 5, wherein the rod is disposed along an opening formed in a side surface of the passage separation partition.

7. The coolant control valve device of claim 5, wherein a partition groove into which an end portion of the passage separation partition is inserted is formed in the valve.

8. The coolant control valve device of claim 5, wherein the passage separation partition is disposed to have a predetermined rotation interval therebetween based on a central axis of the rod, to correspond to the first and second inlets.

9. The coolant control valve device of claim 5, wherein an outer peripheral surface of the valve is formed along a circle based on the rod.

10. The coolant control valve device of claim 2, wherein the plurality of inlets further includes a third inlet, and the plurality of the valve wings includes a third valve wing corresponding to the third inlet of the plurality of inlets.

11. The coolant control valve device of claim 10, wherein the first, second and third valve wings of the valve have outer peripheral surfaces slid along inside peripheral surfaces of the first, second and third inlets, respectively,
the outer peripheral surfaces of the first, second and third valve wings have first, second and third heights, respectively, in a movement direction of the valve, and
the third height is higher than the second height, and the second height is higher than the first height.

12. The coolant control valve device of claim 11, wherein the coolant passages include first, second and third coolant passages communicating with the first, second and third inlets, respectively, and
the coolant control valve device further includes a passage separation partition separating the first, second and third coolant passages from each other.

13. The coolant control valve device of claim 5, further including:
a rotation part rotating the valve through the rod from a first state in which the first inlet corresponds to the first valve wing, and the second inlet corresponds to the second valve wing, to a second state in which the first inlet corresponds to the second valve wing, and the second inlet corresponds to the first valve wing.

14. The coolant control valve device of claim 4, wherein an extension portion is formed at a lower surface of one of the first and second valve wings so that starting positions of the first and second valve wings are different from each other in the movement direction of the valve.

15. The coolant control valve device of claim 14, wherein while the driver pushes the valve, the first valve wing opens the first inlet first, and then the second valve wing opens the second inlet.

16. The coolant control valve device of claim 14, wherein while the driver pulls the valve, the second valve wing opens the second inlet first, and then the first valve wing opens the first inlet.

17. The coolant control valve device of claim 7, wherein when the valve is pulled or pushed by the driver, the partition groove formed in the valve provides a depth to insert the end portion of the passage separation partition.

18. The coolant control valve device of claim 12, wherein the passage separation partition is disposed to have a predetermined rotation interval therebetween based on the rod, to correspond to the first, second and third inlets.

19. A coolant control valve device comprising:
a single rod;
a single valve formed at a first side of the rod to open or close at least first and second inlets;
a passage separation partition separating first and second coolant passages communicating with the first and second inlets, respectively, from each other, and penetrated by the rod in a longitudinal direction of the rod; and
a driver pulling or pushing the rod to open or close at least first and second inlets, respectively,
wherein the valve includes first and second valve wings corresponding to the first and second inlets, the first and second valve wings have outer peripheral surfaces slid along inside peripheral surfaces of the first and second inlets, respectively,
the outer peripheral surfaces of the first and second valve wings have first and second heights in a longitudinal direction of the rod, respectively, and the second height is higher than the first height.

20. The coolant control valve device of claim 19, wherein the passage separation partition is disposed to have a predetermined rotation interval therebetween based on a central axis of the rod, to correspond to the first and second inlets.

* * * * *